United States Patent

[11] 3,563,381

[72] Inventors: Andrew Charles Edelson
10832 Charnock Road, Los Angeles, 90034;
Clyde Charles Nassau, 20602 Pacific Coast Hwy., Malibu, Calif. 90265
[21] Appl. No. 784,830
[22] Filed Dec. 18, 1968
[45] Patented Feb. 16, 1971

[54] DIALYSIS APPARATUS
7 Claims, 3 Drawing Figs.

[52] U.S. Cl. ........................................... 210/96, 128/214; 210/321
[51] Int. Cl. ................................................ B01d 13/00
[50] Field of Search ........................................... 128/214; 210/22, 23, 87, 96, 321

[56] References Cited
UNITED STATES PATENTS
| | | | |
|---|---|---|---|
| 3,352,779 | 11/1967 | Austin et al. | 210/23 |
| 3,406,826 | 10/1968 | Willock | 210/87 |
| 3,416,664 | 12/1968 | Kumme et al. | 210/87 |
| 3,441,136 | 4/1969 | Serfass et al. | 210/321X |
| 3,457,944 | 7/1969 | Cary et al. | 210/321 |

Primary Examiner—Dalton L. Truluck
Attorney—Herzig and Walsh

ABSTRACT: The invention is a dialysis apparatus for supplying dialysate at controlled concentration to an artificial kidney. The system provides for a supply of water at controlled temperature, and a supply of dialysate concentrate with means for mixing the controlled temperature water and concentrate to maintain a supply of dialysate at a controlled degree of concentration to be supplied to the artificial kidney. The system does not have a tank or reservoir of dialysate at a maintained degree of concentration. Interlocking safety controls are provided so as to discontinue the flow of dialysate in the event the temperature, the degree of concentration, or arterial pressure of the patient depart from predetermined limits. Additionally, audible and visual alarm signals are provided to indicate at all times when the said conditions are within limits and to indicate when any condition goes outside of the limits, the indication being both audible and visual. Further, the system provides means to mute the audible signal while still maintaining the machine in operation and further means are provided to safely sterilize the machine without danger to the patient.

INVENTORS
ANDREW C. EDELSON
CLYDE C. NASSAW

BY Herzig & Walsh
ATTORNEYS

DIALYSIS APPARATUS

SUMMARY OF THE INVENTION

The invention is an improved dialysis apparatus, or machine which is fully automatic and equipped with automatic interlocking safety controls whereby to make possible operation of the machine by relatively inexperienced personnel with complete safety to the patient.

Machines of this type are used to supply dialysate at predetermined controlled concentration to artificial kidneys which are devices used to treat patients having kidney diseases. The dialysate under controlled conditions is passed through the artificial kidney and the patient's blood is pumped through the artificial kidney. The machine or system of the invention embodies certain improvements over machines of this type previously known in the art. In the machine of the invention the dialysate is supplied to the artificial kidney under automatically controlled conditions as to temperature, degree of concentration, and arterial pressure of the patient. The construction and arrangement of the machine is such that it is not necessary to have a tank or reservoir of dialysate maintained at a controlled degree of concentration. A vessel of concentrate is maintained, the concentrate, of course, being the super saturated saline solution of water and the concentrate and this solution may be maintained in the vessel simply by the addition of prepackaged dried chemicals added to water. The control of flow from this vessel is by way of a manually adjustable needle valve to the end that dialysate can be supplied at an appropriate degree of concentration which is maintained within limits by way of a conductivity responsive instrument which is sensitive to the degree of concentration and is able to discontinue the supply in the event that the concentration departs from said limits. The arrangement as stated, eliminates the need for a storage tank or reservoir of concentrate and maintenance of such a tank at a predetermined concentration. This makes possible the realization of important advantages from the stand point of cost of the machine, cost of dialysate, and by way of simplicity of construction, maintenance, and effective control. Achievement of these results constitute primary objects of the invention.

The automatic controls responsive to the temperature of the dialysate, degree of concentration, and arterial pressure of the patient interlock to provide for complete safety of operation of the system even when being operated by relatively inexperienced personnel, there being audible and visual alarm signals associated with each of the condition-responsive instruments to indicate when the conditions are within limits and when they are outside these limits. Furthermore, means are provided in the system for muting the audible alarm signal while still being capable of having the machine operate to provide dialysate. Additionally, means are provided for sterilizing the machine after use under conditions that are completely safe from the standpoint of the patient. The realization of the safety factors as briefly referred to herein are among the additional and further objects of the invention.

Further objects and additional advantages of the invention will become apparent from the following detailed description and annexed drawings wherein:

FIG. 3 is a view of a modified form of system for supplying the dialysate solution.

Figure 1:
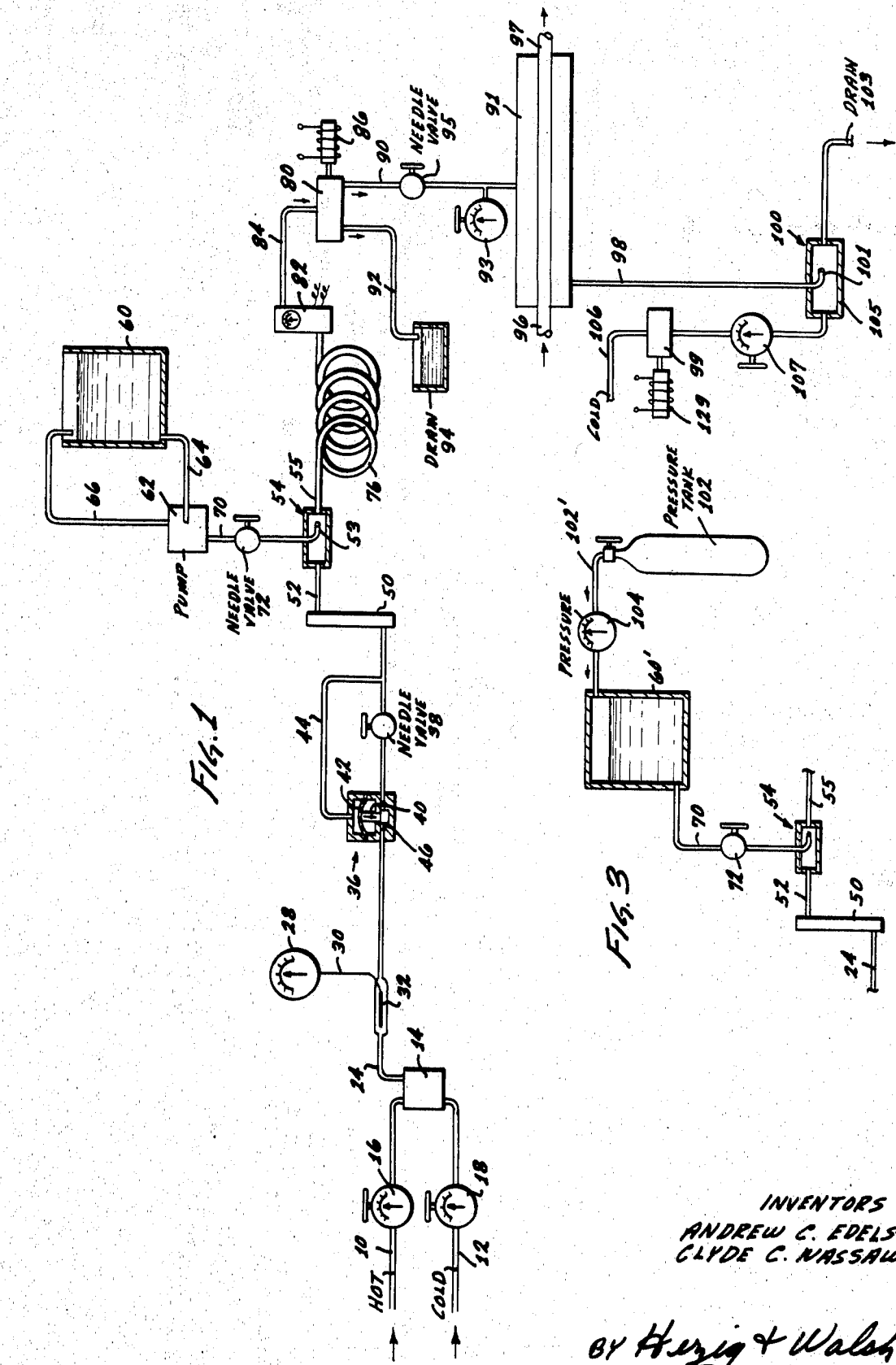
FIG. 1 is a diagrammatic view of the components of the system which supply the dialysate solution to the artificial kidney.

Referring to FIG. 1 of the drawings numeral 10 designates a pipe supplying hot water, and numeral 12 designates a pipe supplying cold water. These pipes connect to a temperature responsive mixing valve 14. In the pipe 10 is a pressure regulator 16 which regulates the pressure in pipe 10 and in pipe 12 is a pressure regulator 18 which regulates the pressure in this pipe. The pressure regulators may be of conventional type as may be the valve 14 which is temperature responsive as indicated, being connected to an outlet pipe 24 in which the temperature is maintained by the valve at a specific temperature which in this instance is preferably 100° F.

The temperature of the mixed water is sensed and indicated by a temperature indicating instrument 28 connected by a line 30 to a sensing probe 32 in the line 24. This temperature indicating instrument or thermometer may be of a conventional type.

Numeral 36 designates a flow controller in the line 24 depending upon the setting of needle valve 38 in the line 24 beyond the controller 36. The flow controller 36 may be of any of various types. It is shown schematically as being of a type embodying a plunger 40 movable in response to a diaphragm 42 in the casing of the controller 36. The diaphragm chamber is connected to the line 24 beyond the needle valve 38 by way of line 44, so that the diaphragm is responsive to pressure beyond the needle valve. The controller 36 has a transverse channel 46 in it and the plunger 40 is movable across this channel by the diaphragm 42 to control the rate of flow.

Beyond the needle valve 38 the line 24 connects to a flow meter 50 which is an indicating type of instrument preferably placed on a control panel which indicates the rate of water flow.

The flow meter 50 is connected by line 52 to a filter pump 54 which assists in mixing the dilutant with the concentrate. The filter pump is a known type of device which in the form of the invention is a venturi formed by nozzle 53 in the pump chamber which discharges toward or into the orifice at the end of discharge line 55. Pump 54 serves to mix the water and concentrate.

Numeral 60 designates a vessel in which a supply of concentrate is provided which is the super saturated saline solution. Preferably recirculation is maintained at all times through this vessel by a pump 62 which receives concentrate from the bottom vessel 60 through pipe 64 and returns into the top of the vessel through a pipe 66.

Associated with the pump 62 is a chamber for concentrate which is connected by pipe 70 to the filter pump 54, there being a needle valve 72 in this line for adjusting the rate of flow of concentrate to the filter pump 54. The filter pump 54 is connected to a tube coil or hose having loops in it as designated at 76 which in turn connects to the three-way solenoid valve which is the dialysate valve 80. This connection is through the electric cell 82 which is a conductivity-responsive cell that measures or senses the conductivity and hence the degree of concentration of the solution passing through line 84 to the dialysate valve 80.

The dialysate valve 80 is a solenoid operated three-way valve operated by the electric solenoid 86. The solenoid valve allows dialysate to flow either through the line 90 to the artificial kidney or through the line 92 to drain 94.

In line 90 is a needle valve 95 and connected to it is negative pressure gauge 93. The artificial kidney is shown schematically at 91, the blood flow in and out being indicated at 96 and 97. Dialysate drains from the kidney through line 98. By opening the negative pressure solenoid valve 99 suction can be applied to the artificial kidney to augment the flow of dialysate. Numeral 100 designates a venturi device or pump having nozzle 101 in chamber 105 which is connected to drain line 103. Cold water line 106 connects to chamber 105 and in this line are the negative pressure valve 99, and pressure regulator 107. The degree of applied negative pressure created by device 100 is controlled by needle valve 95.

All of the parts of the system so far described are preferably of very reliable types that are easy to maintain and are subject to very effective and precise automatic control with all of the necessary safety factors embodied in the control sequence. The automatic controls and the control sequence will be described presently. It will be observed that no tank or reservoir of mixed dialysate at controlled concentration is present in the system so that it is not necessary to provide and maintain such a tank. On the other hand the vessel 60 is merely provided in which the dry chemicals can be mixed, with the rate of flow of concentrate from the vessel 60 to the filter pump 54 being under the control of the needle valve 72. Needle valve 72 is manually adjustable to provide a rate of flow of concentrate that mixes with the flow of water at controlled temperature to provide the flow of dialysate at appropriate concentration. The coil or loop 76 assists in the mixing which is at all times being monitored by the conductivity meter 82 to simply operate the three-way valve 80 to cause the solution to flow to drain in the event that the degree of concentration deviates outside of the prescribed set limits.

As a modification of the system described, of course, the system may be operated without employing the recirculation pump and a float valve may be provided in the chamber at that point maintaining a fixed head of liquid which then flows through the line 70 and the needle valve 72 to the filter pump 54. Another alternative is that as shown in FIG. 3 wherein the vessel 60' is connected through the needle valve 72 to the filter pump 54. The vessel 60' is pressurized by way of air pressure from a pressure tank or cylinder 102 which provides for flow of pressurized air through a line 102' and a pressure gauge 104 into the vessel 60 above the level of the concentrate. Thus, appropriate pressure is applied in the vessel 60' to drive the concentrate through the line 70 to the filter pump 54, and then as in the system as previously described the conductivity meter responds to the degree of concentration and controls the three-way valve.

Figure 2:
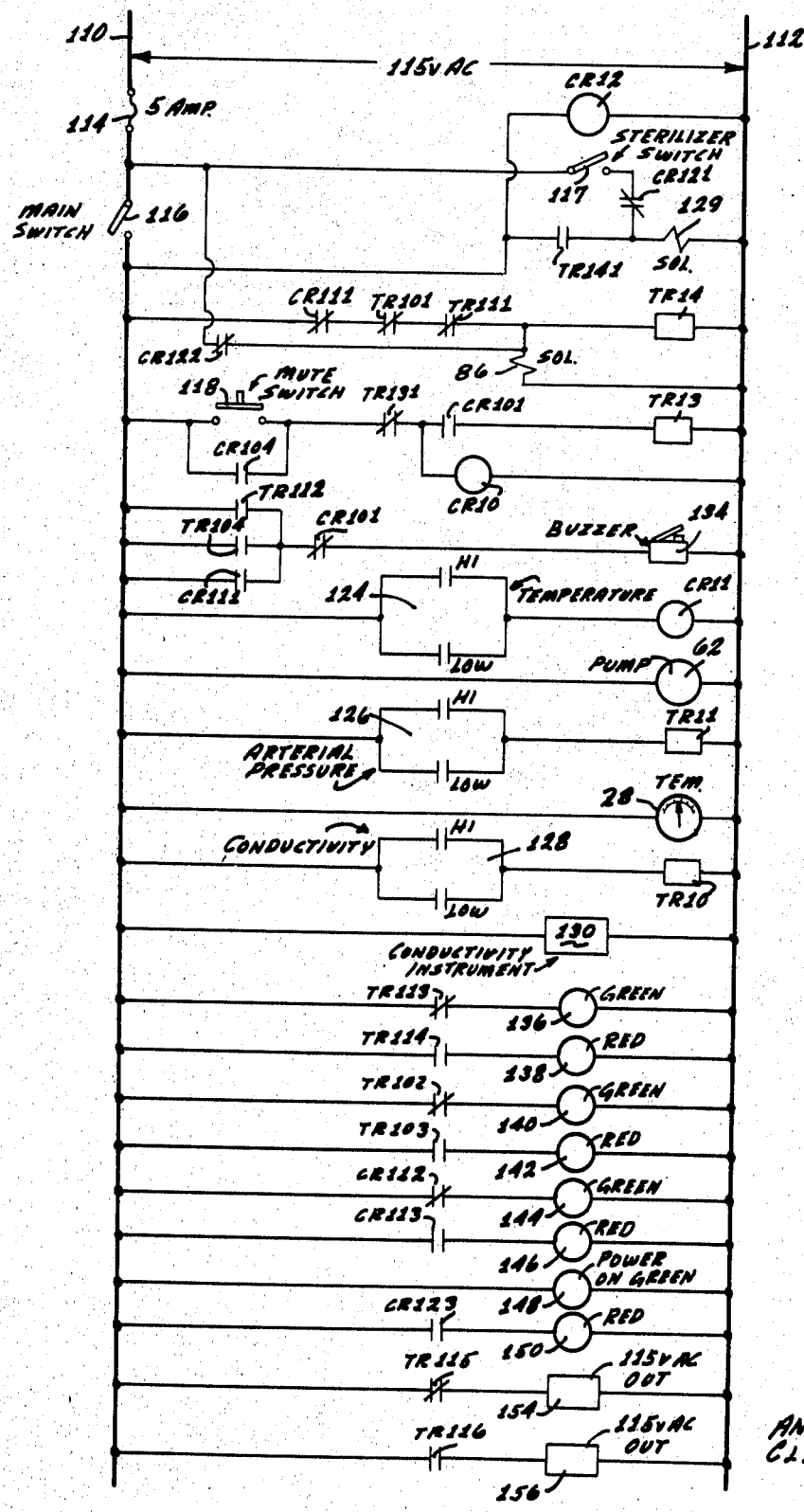
FIG. 2 is a schematic electrical diagram of the electrical controls that control the supply of dialysate and provide for signal in the event of occurrence of any condition which would be unsafe, and also for signals indicative of conditions being within safe limits.

FIG. 2 as indicated in the foregoing is a grid-type schematic diagram of the electrical controls and alarm circuitry. Preferably the power supply is at 115 volts AC the line being designated by the numerals 110 and 112. In the line is a fuse 114 and a manual control switch 116. The solenoid 86 for valve 80 appears adjacent to the contacts CR 111; TR 101; and TR 111. The controls include the manual sterilizer switch 117, and the mute switch 118 which is manually actuatable. The controls also include the relays CR 10; CR 11 and CR 12 which are designated by circles and the various contacts of these relays are shown as either normally open or normally closed and designated by corresponding reference characters. The controls also include the relays TR 10; TR 11; TR 13 and TR 14 and the contacts at these relays which are either normally open or normally closed are identified by corresponding reference characters. CR relays are designated by circles and TR relays by rectangles. The character TR indicates that the relay is a time delay type having typically a time delay characteristic that may be from 10 seconds to 30 seconds will elapse before the relay pulls in after being energized. The character CR indicates "control relay".

The controls also include the temperature control instrument 124; the arterial pressure control instrument 126; and the concentrate control instrument 128 which is a conductivity instrument. Numeral 130 is a conductivity indicating instrument which preferably is exposed on the control panel of the machine.

Numeral 134 designates an audible signal device in the form of a buzzer. Numerals 136 through 150 designate red and green signal lights.

The operation of the system is very simple with the safety of the patient a foremost factor at all times. The safety interlocks are so arranged that the machine cannot be used unless all vital monitoring gauges and alarm units are within their respective ranges.

The machine is started by closing the main switch 116. When this switch is closed supply of dialysate may begin unless an alarm or unsafe condition exists. The machine will not start until all of the units responsive to temperature, conductivity, (Degree of concentration) and arterial pressure are indicating a safe condition and if not there will be indicated an alarm condition by way of the alarm buzzer and respective red signal lights as will be described.

As will be observed from FIG. 2 relay CR 11 is in series with the temperature responsive instrument 124. The relay TR 11 is in series with the arterial pressure responsive instrument 126. The relay TR 10 is in series with the conductivity responsive instrument 128. As the temperature, conductivity, and arterial pressure come within limits these relays will be deenergized and as this occurs the contacts CR 111, TR 101, and TR 111 in series with the dialysate solenoid 86 will close which is their normal position, and will cause the dialysate solenoid to open the dialysate valve to permit flow of solution to the artificial kidney. After a 30 second time delay following closure of these contacts the relay TR 14 will be energized this relay being a time delay relay. At the time that relay TR 14 is energized its contacts TR 141 will close energizing the negative pressure solenoid 129. When all of these events have taken place the machine is in condition to produce dialysate as long as all of the alarm units stay within limits. The negative pressure solenoid operates a valve making it possible to apply negative pressure across the membranes of the artificial kidney, as described in the foregoing.

In the event an alarm condition exists the machine immediately stops dialysis. This happens because opening of any of the contacts CR 111, TR 101, or TR 111 will deenergize the solenoid 86 and the relay TR 14. Deenergization of relay TR 14 will deenergize the negative pressure solenoid by opening contact TR 141. Energization of any of relays CR 111; TR 10; or TR 11 will close one or more of contacts TR 112; TR 104; or CR 111 thus energizing buzzer 134 through closed contact CR 101. Energization of any of these relays will cause its respective green signal light to go off and its respective red warning light to come on. It will be observed that relay contacts TR 113; TR 114; TR 102; TR 103; CR 112; CR 113 and CR 123 control green and red lights 136 through 150.

When an alarm condition exists it is desirable to mute the alarm buzzer and yet still keep the machine from continuing dialysis. This is accomplished by way of the mute switch and circuitry. In order to silence the buzzer the mute switch is depressed, that is, the switch 118. When this occurs relay CR 10 will energize through closed contact TR 131. The relay CR 10 will stay energized until relay TR 13 energizes. This relay will energize after a 30-second time delay through contact CR 103 the relay being a time delay type. After relay TR 13 is energized it will deenergize relay CR 10 by opening contact TR 131. At this time if the out of limits condition has not been corrected the alarm buzzer will again sound, because contact CR 101 is again closed. The mute switch circuitry will recycle at intervals resounding the buzzer until all conditions come back within limits.

After the machine has been used it is necessary to run a sterilization solution through it. In order to sterilize the machine without any possibility of harming the patient the machine can be sterilized only when the power switch is turned off. It is seen from the diagram of FIG. 2 that when the power switch 116 is turned off relay CR 12 is deenergized and only at this time can the sterilize switch 117 energize the negative pressure solenoid, through contact CR 121. Thus, the negative pressure valve 99 opens. Contact CR 122 of relay CR 12 will energize solenoid 86 opening valve 80 to allow flow to the artificial kidney. Any remaining dialysate is drained away and sterilizing solution placed in vessel 60. Alternatively, a canister containing sterilizing solution is substituted for vessel 60 for performing the sterilizing function.

From the foregoing it will be observed that whenever an alarm unit goes out of limits its respective green light extinguishes and its red warning light comes on, the alarm buzzer sounds and the machine stops dialysis until the alarm condition is back within limits. The arterial pressure gauge and the pressure gauge have mechanical contacts that complete the respective circuits when the needles or pointers on the gauges make contact with the high and low limit contacts and, therefore, these gauges are known as contact meters. The conductivity unit is a commercial device that is readily available on the market. When the arterial pressure gauge goes out of limits the relay energizes through one of its contacts TR 115 deenergizes an external outlet 154 while its other contact TR 116 energizes another external outlet, 156 which outlets can serve to control for example the patients blood pump, a pressure cuff, etc.

From the foregoing, those skilled in the art will readily understand the nature of the invention, its construction and operation, and the manner in which it achieves and realizes the objects and advantages as set forth in the foregoing.

The foregoing disclosure is representative of preferred forms of the invention and is to be interpreted in an illustrative rather than a limiting sense the invention to be accorded the full scope of the appended claims.

I claim:

1. A dialysate supply and control system comprising:
   a source of dialysate concentrate;
   a mixing means;
   first conduit means for conducting concentrate from said source to said mixing means and means for maintaining concentrate delivered to said conduit under controlled pressure;
   selectively manual settable valve means in said first conduit between said mixing means and said source of concentrate for establishing a predetermined rate of flow of concentrate therein;
   a source of controlled temperature diluent and a second conduit means for conducting diluent from its source to said mixing means;
   selectively settable means in said second conduit means for establishing and maintaining a predetermined rate of flow of diluent therein;
   third conduit means for delivering mixed concentrate and diluent from said mixing means to an artificial kidney or the like; and
   means in said third conduit means for detecting the concentration of dialysate therein and responsive to deviation of said concentration from a predetermined range for stopping flow of said mixture to said artificial kidney or the like.

2. The system as in claim 1, wherein the source of dialysate solution comprises a tank of concentrate and means for applying controlled pressure to the concentrate in the tank.

3. A system as in claim 1, including sources of hot and cold dilutant and a temperature responsive mixing valve for providing the controlled temperature dilutant.

4. An apparatus as in claim 1 wherein said last-named means comprises a valve operable to stop the flow of dialysate to the artificial kidney.

5. An apparatus as in claim 4 including means responsive to temperature and to arterial blood pressure of a patient for stopping flow of dialysate.

6. An apparatus as in claim 1, including signal means operable to provide a signal in the event of deviation of the degree of concentration of the dialysate from a predetermined value.

7. An apparatus as in claim 6 including manually operable means to terminate the signal and to cause the signal to be reinitiated after a predetermined time in the event the deviation remains present.